United States Patent [19]

Broer et al.

[11] Patent Number: 4,758,447

[45] Date of Patent: Jul. 19, 1988

[54] METHOD OF MANUFACTURING AN OPTICAL FIBRE

[75] Inventors: Dirk J. Broer, Geldrop, Netherlands; Katsumi Kondo, Hitachi, Japan

[73] Assignee: U.S. Philips Corp., New York, N.Y.

[21] Appl. No.: 97,225

[22] Filed: Sep. 15, 1987

[30] Foreign Application Priority Data

Sep. 16, 1986 [NL] Netherlands ................ 8602337

[51] Int. Cl.$^4$ .................. B05D 1/06; B05B 5/00
[52] U.S. Cl. ..................... 427/44; 427/54.1; 427/163; 427/165; 427/299; 427/407.2
[58] Field of Search ............. 427/44, 54.1; 350/96.23, 96.29, 96.33; 427/165, 163, 299, 407.2

[56] References Cited

U.S. PATENT DOCUMENTS

| | | | |
|---|---|---|---|
| 3,871,904 | 3/1975 | Haas et al. | 427/165 |
| 4,038,441 | 7/1977 | Dubois | 427/165 |
| 4,370,194 | 1/1983 | Shares et al. | 427/165 |

*Primary Examiner*—Janyce A. Bell
*Attorney, Agent, or Firm*—Ernestine Bartlett

[57] ABSTRACT

The invention relates to a method of manufacturing an optical fibre which is provided with a synthetic resin cladding and which comprises at least one layer of oriented molecules which is obtained by first orienting a liquid crystalline curable synthetic resin composition and then curing it. The orientation process is carried out readily and efficaciously by rubbing the surface of the fibre before the curable synthetic resin composition is applied thereto.

21 Claims, 2 Drawing Sheets

METHOD OF MANUFACTURING AN OPTICAL FIBRE

BACKGROUND OF THE INVENTION

The invention relates to a method of manufacturing an optical fibre which is provided with a synthetic resin cladding, a curable synthetic resin composition being applied to a glass fibre having at least one enveloping layer of a synthetic rubber, which synthetic resin composition comprises one or more oligomeric compounds whose molecules contain reactive groups and have a molecular weight below 5000, which molecules exhibit a liquid crystalline behaviour, the molecules of the curable synthetic resin composition being oriented during the application of this composition to the glass fibre, after which the curable synthetic resin composition is cured, thereby forming a synthetic resin whose molecules are oriented mainly in the longitudinal direction of the optical fibre.

Glass fibres for optical telecommunication purposes generally have a cladding of a synthetic resin so as to prevent mechanical damage. In order to prevent optical transmission losses as a result of microbends, a cladding is preferred which is built up from various layers. For example, the following method is used. Immediately after the formation of the glass fibre, for example, by drawing from a preform or by means of the double-crucible method, a first soft buffer layer is applied consisting of a synthetic rubber having a modulus of elasticity from 1 to 10 MPa. In order to protect this soft buffer layer during the further processing of the optical fibre, a second harder synthetic resin top layer is applied having a modulous of elasticity exceeding 100 MPa. This top layer is also applied directly after the formation of the glass fibre, for example before the fibre is guided over a pulley or stored. The buffer layer and the top layer together constitute the primary synthetic resin cladding of the glassfibre.

In order to protect the optical fibre from ambient influences during the cabling, during laying the cables and during the life of the cables, the optical fibre is additionally provided with a thicker secondary synthetic resin cladding having a modulus of elasticity exceeding 1 GPa. This secondary synthetic resin cladding is not necessarily applied directly after the formation of the glass fibre.

Two forms of such a secondary synthetic resin cladding are used. In one form the optical fibre with the primary synthetic resin cladding is positioned freely in the secondary synthetic resin cladding which thus forms a tube. The space between the optical fibre and the tube is generally filled with a thixotropic liquid or gel, for example, a silica-filled silicon oil. In the other form the secondary synthetic resin cladding is bonded in an adhering manner with the primary synthetic resin cladding.

It is known that the microbend losses of an optical fibre under transverse load can be made small without resulting in a great temperature sensitivity, by giving the molecules of a part of the synthetic resin cladding a preferred orientation in the longitudinal direction of the optical fibre. As a result of this, the modulus of elasticity of the synthetic resin in the longitudinal direction is increased whereas the coefficient of thermal expansion becomes smaller. The coefficient of thermal expansion of the glass fibre preferably is substantially equal to that of the synthetic resin.

U.S. Application Ser. No. 903,008, filed Sept. 2, 1986 and entitled "Optical Fibre Comprising a Synthetic Resin Cladding and Method of and Device for Manufacturing Such an Optical Fibre" describes the manufacture of such an optical fibre in which the oriented synthetic resin is formed of a curable synthetic resin composition. The molecules of the curable synthetic resin composition are oriented during the application of this composition to the glass fibre, preferably, by means of an elongation flow. In particular a synthetic resin composition is used which comprises one or more compounds which exhibit liquid crystalline properties.

SUMMARY OF THE INVENTION

It is an object of the invention to provide an optical fibre and a method of manufacturing thereof, in which the orientation in the glass fibre cladding is increased in a readily conceivable and effective way, thereby increasing the mechanical strenght of said optical fibre.

This object is achieved in accordance with the invention by a method as described in the opening paragraph, which is further characterized in that the molecules of the curable synthetic resin composition are oriented, by rubbing the surface on which the curable synthetic resin is to be provided in the longitudinal direction of the fibre, before the curable synthetic resin composition is applied.

British Patent Specification GB No. 1416836 discloses a way of influencing the ordering of low-molecular liquid crystalline compounds in a flat display device by rubbing the electrode surfaces which are clad with synthetic resin in one or more desired directions, for example, to impart a helical structure to the liquid crystalline material, such that the helical axis is perpendicular to the electrode surfaces. The present invention, however, has for its object to orient the oligomeric molecules by rubbing a cylindrical surface so that said molecules are parallel to the extent possible to each other and to the longitudinal direction of the optical fibre and to fix the structure thus obtained in a curing process in which a mechanically strong protective cladding is obtained.

Instead of subjecting the surface to be clad to an elongation flow it may also be rubbed to orient the molecules in the curable synthetic resin composition. In a very efficacious embodiment of the method in accordance with the invention, the molecules of the curable synthetic resin composition are additionally oriented during the application of said composition to the glass fibre by means of an elongation flow.

The surface to be rubbed may be the surface of the first enveloping synthetic rubber layer. In a preferred embodiment of the method in accordance with the invention a protective layer of a curable synthetic resin composition is provided between the enveloping synthetic rubber layer and the oriented layer, which protective layer is made to cure after which its surface is rubbed and the curable synthetic resin composition to be oriented is applied. The elasticity of the protective layer is smaller than that of the synthetic rubber, such that after rubbing the orienting layer exhibits a reduced degree of relaxation.

In a preferred embodiment of the method in accordance with the invention, the curable synthetic resin composition is made to cure by means of actinic radiation. Actinic radiation is to be understood to mean, for example, radiation with UV-light, electrons, X-rays, gamma-rays or high energy particles. Exposure to UV-light results in curing times shorter than 0.1 s. Particularly short curing times can be obtained by curing in a nitrogen atmosphere. It is efficacious to place the irradiation device at the shortest possible distance from the fibre cladding device to restrict loss of orientation of the oriented molecules. A known advantage of the use of a radiation-curable synthetic resin composition is the absence of solvents and other substances which have to be removed from the layer during the curing process or as a result of the curing process. In the method according to the invention this not only favours the curing rate and the maintenance of the orientation of the molecules but also the protection of the environment.

DESCRIPTION OF THE DRAWINGS

The invention will now be explained in more detail with reference to exemplary embodiments and a drawing, in which

FIGS. 4 and 5 schematically show two embodiments of arrangements suitable for carrying out the inventive method, and in which

DETAILED DESCRIPTION OF THE PREFERRED EMBODIMENTS

Example 1

Figure 1A:
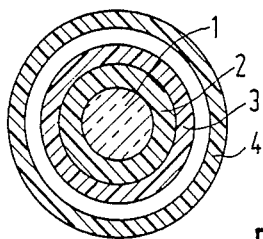
FIGS. 1a and 1b are sectional views of two alternative embodiments of an optical fibre, which are manufactured according to the inventive method.
Figure 4:
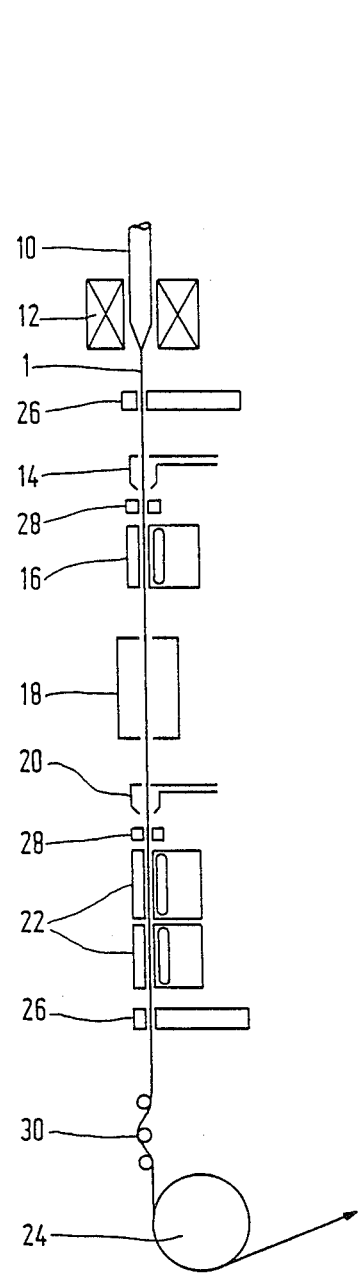

A glass fibre is formed in known manner by drawing from a preform 10 in an oven 12, see FIG. 4. Glass fibre is to be understood to mean a fibre of glass or quartz glass. The fibre comprises a core glass and a cladding glass having different refractive indices (not shown in the FIGS. 1a and 1b). Alternatively, a fibre having a refractive index which gradually varies from the centre to the outside may be used, and instead of a fibre drawn from a preform, a fibre manufactured by means of the double crucible method may be used. The glass fibre 1 shown in FIG. 1 has a circular cross-section (diameter 125 $\mu$m), but the cross-section may alternatively have any other shape, for example elliptical.

Figure 2:
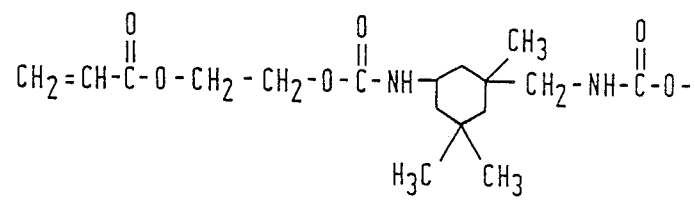
FIG. 2 shows the structural formula of a polyetherurethane acrylate.
Figure 2:
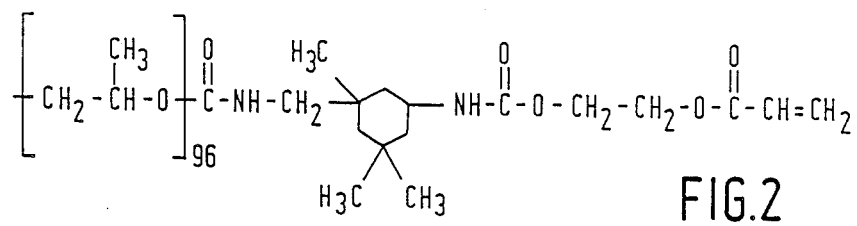

Right after the formation of the glass fibre 1 a layer of a curable synthetic resin composition is provided thereon by means of a fibre cladding device 14, which layer is then cured to form a buffer layer 2 of a synthetic rubber having a thickness of 30 $\mu$m. The curable synthetic resin composition contains as the main constituent (76% by weight) a polyetherurethane acrylate as descirbed in European Patent Application EP No. 167.199 and shown in FIG. 2. The curable synthetic resin composition further comprises the reactive monomers 2-phenoxy-ethyl acrylate (14% by weight) and hexanediol diacrylate (2% by weight), and the photosensitive initiators 2,2-dimethoxy-2-phenyl-acetophenone (2% by weight), 2,2-dimethyl-2-hydroxyacetophenone (2% by weight) and 2-oxybenzophenone-2-ethoxy-ethylacetophenone (2% by weight). The curable synthetic resin composition finally comprises 2% by weight of a mixture of mono- and di-2-acryloxyethyl-phosphate having a molecular ratio of 1:1. Other curable synthetic resin compositions, for example polysiloxanes, may also suitably be used in the buffer layer of the synthetic resin cladding of the glass fibre according to the invention. The curable synthetic resin composition is cured by radiation from a high pressure mercury lamp 16, which produces UV-light having wavelengths of from 200 to 400 nm with an intensity of 0.27 W/cm$^2$, measured on the synthetic resin layer for at most 0.5 s(seconds). The curable synthetic resin composition may also be cured differently, for example, by exposure to electrons, in which case the curable synthetic resin composition need not comprise a photosensitive initiator.

After the first buffer layer has been cured, the surface of the optical fibre is rubbed, for example, by moving the fibre past a non-fluff velvet cloth 18 which is wrapped around said fibre. Alternatively, other materials such as a paper or cotton gauze may be used instead of velvet.

Figure 3:
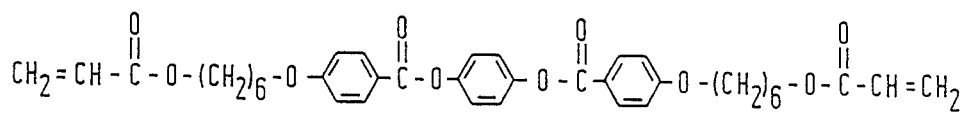
FIG. 3 shows the structural formula of an oligomeric ester urethane acrylate.

A second 30 $\mu$m thick layer of a synthetic resin 3 is then applied to the fibre (see FIG. 1a) by means of a fibre-cladding device 20. For this purpose a curable synthetic resin composition is used which comprises 98% by weight of a liquid crystalline oligomeric acrylate as shown in FIG. 3 and which further comprises 2% by weight of the photosensitive initiator $\alpha$-hydroxy-$\alpha$-methyl-ethyl phenyl ketone. Other suitable liquid crystalline synthetic resin compositions are described in said U.S. Ser. No. 903,008 referred to hereinabove. This synthetic resin composition is applied to the glass fibre with the buffer layer and is cured by exposure to an electrodeless mercury lamp of Fusion Systems Inc. with an intensity of 0.27 W/cm$^2$, measured on the synthetic resin composition. The curing process is carried out in the temperature range in which the synthetic resin composition exhibits a liquid crystalline behaviour. In the case of the compound shown in FIG. 3, said temperature range is between 72° and 157° C. In this exemplary embodiment the curing temperature is 85° C. Due to the low viscosity, the liquid crystalline compound may alternatively be applied to the fibre at a higher temperature. By curing in a nitrogen atmosphere the curing time is less than 0.03 sec. Finally, the optical fibre is guided over a pulley 24, for example, to be wound on a reel which is not shown in the drawing.

The orientation in the resulting synthetic resin layer 3 can be made visible by means of a polarisation microscope. The anisotropic (oriented) material is characterized by a low axial coefficient of expansion ( linear coefficient of thermal expansion) and a high axial modulus of elasticity and fracture strength.

The optical fibre may be further protected by enveloping it with a subsequent layer of a thermoplastic synthetic resin, for example, of poly butylene terephtalate or nylon, in the form of a tube 4 in which the fibre can move freely. Thus, a temperature insensitive optical fibre is obtained.

The arrangement shown in FIG. 4 may be provided in a conventional manner with process-control means, such as equipment 26 for measuring the diameter of the fibre, equipment 28 for measuring the concentricity of the glass fibre in the synthetic resin cladding and a fibre tensometer 30.

Example 2

In the manner described in example 1, a glass fibre 1 is produced and coated with a 30 μm thick buffer layer 2 of a synthetic rubber.

Figure 1B:
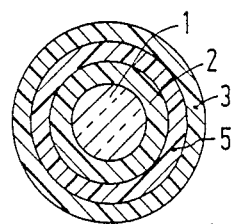
Figure 5:
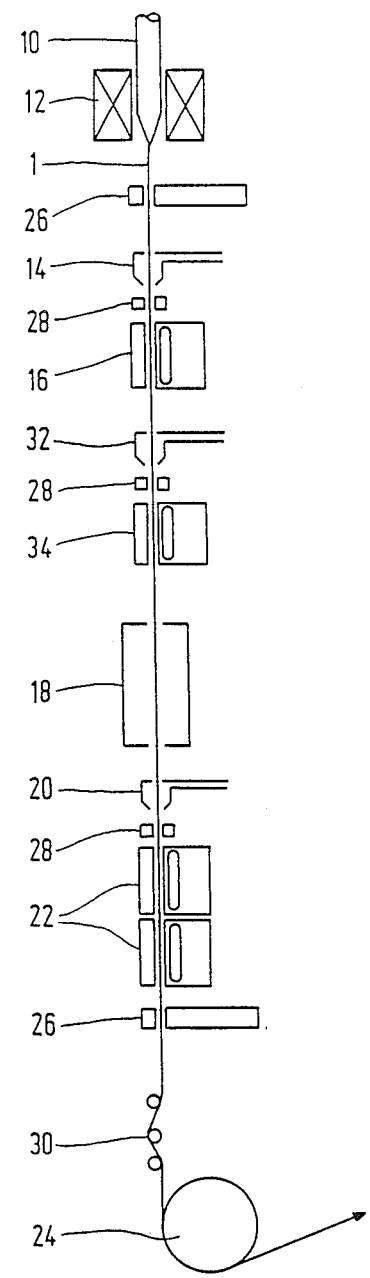

A 5 μm thick protective layer 5 is then provided, see FIG. 1b. Said layer is manufactured by applying a curable synthetic resin composition to the fibre by means of a fibre cladding arrangement 32 (see FIG. 5), which synthetic resin composition is then cured by means of a high pressure mercury lamp 34. The remaining elements of the arrangement shown in FIG. 5 corresponds to those of FIG. 4 and have been described in example 1.

Figure 6:
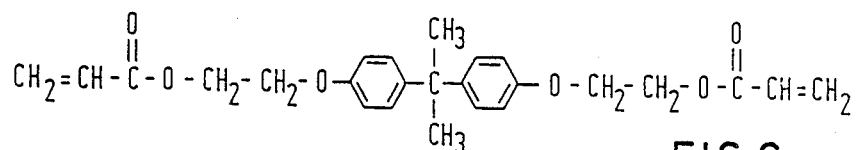
FIGS. 6 and 7 show the structural formulas of compounds which can suitably be used in a protective layer according to the invention.
Figure 7:
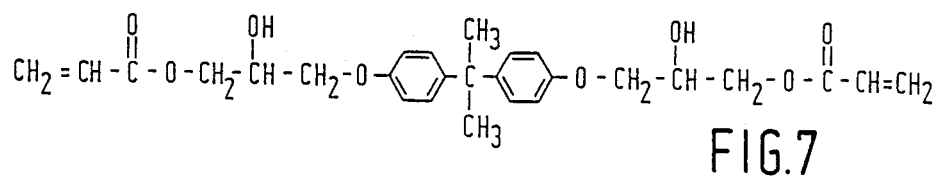

The curable synthetic resin composition used to form the protective layer 5 comprises, for example, 52% by weight of an ethoxylated bisphenol-A diacrylate in accordance with FIG. 6, 40% by weight of an epoxy acrylate in accordance with FIG. 7, and the following photosensitive initiators: 4% by weight of 2,2-dimethyl-2-hydroxy-acetophenone and 4% by weight of 2-oxybenzophenone-2-ethoxyethyl acrylate.

The protective layer has a higher shear resistance than the first buffer layer. To the lower degree of elasticity results in a better orientation of the molecules in the next layer. On the other hand, the linear coefficient of thermal expansion is higher than usual but due to the small thickness of the layer this does not adversely affect the low temperature resistance of the optical fibre.

The surface of the protective layer is rubbed in the manner described in example 1, after which an oriented layer 3 having a thickness of 25 μm is provided, also in the manner described in example 1.

The optical fibre thus obtained has a high mechanical strength and a low temperature sensitivity.

What is claimed is:

1. A method of manufacturing an optical fibre which is provided with a synthetic resin cladding, a curable synthetic resin composition being applied to a glass fibre having at least one enveloping or buffer layer of a synthetic rubber, which synthetic resin composition comprises one or more oligomeric compounds whose molecules contain reactive groups and have a molecular weight below 5000, which molecules exhibit a liquid crystalline behaviour, the molecules of the curable synthetic resin composition being oriented during the application of this composition to the glass fibre, after which the curable synthetic resin composition is cured, thereby forming a synthetic resin whose molecules are oriented mainly in the longitudinal direction of the optical fibre, characterized in that the molecules of the curable synthetic resin composition are oriented by rubbing the surface to which the curable synthetic resin composition is to be applied in the longitudinal direction of the fibre before the curable synthetic resin composition is applied.

2. A method as claimed in claim 1, characterized in that the molecules of the curable synthetic resin composition are additionally oriented during the application of said composition to the glass fibre by means of an elongation flow.

3. A method as claimed in claim 1, characterized in that a protective layer of a curable synthetic resin composition is provided between the synthetic rubber enveloping or buffer layer and the oriented layer, which protective layer is cured after which its surface is rubbed and the curable synthetic resin composition to be oriented is applied.

4. A method as claimed in claim 1, characterized in that the curable synthetic resin composition is cured by subjecting it to actinic radiation.

5. A method as claimed in claim 2, characterized in that a protective layer of a curable synthetic resin composition is provided between the synthetic rubber enveloping or buffer layer and the oriented layer, which protective layer is cured after which its surface is rubbed and the curable synthetic resin composition to be oriented is applied.

6. A method as claimed in claim 2, characterized in that the curable synthetic resin composition is cured by subjecting it to actinic radiation.

7. A method as claimed in claim 3, characterized in that the curable synthetic resin composition is cured by subjecting it to actinic radiation.

8. A method of manufacturing an optical fiber which is provided with an improved synthetic resin cladding comprising the steps of:
   (1) applying to a glass fiber a synthetic resin curable to form a buffer layer of synthetic rubber;
   (2) curing said buffer layer;
   (3) rubbing the surface of said cured buffer layer in the longitudinal direction of said fiber;
   (4) applying a synthetic resin which exhibits a liquid crystalline behavior, the rubbing in step (3) being sufficient to orient the molecules of said liquid crystalline resin in the longitudinal direction of the fiber; and
   (5) curing said synthetic resin to form a cured, oriented layer.

9. A method as claimed in claim 8 in which the buffer layer is formed by exposing said synthetic resin in step (1) to actinic radiation.

10. A method as claimed in claim 8 in which the synthetic resin which exhibits a liquid crystalline behavior is cured by exposing said resin to actinic radiation.

11. A method as claimed in claim 8 in which said synthetic resin in step (1) comprises a mixture of a polyurethane acrylate; 2-phenoxy-ethyl acrylate; hexane diol diacrylate; an acetophenone photosensitive initiator; and a mixture of mono- and di-2-acryloxyethyl phosphate having a molecular ratio of 1:1.

12. A method as claimed in claim 11 in which said resin exhibiting liquid crystalline behavior is an oligomeric acrylate.

13. A method as claimed in claim 8 comprising the additional step of forming a protective layer between said buffer layer and said oriented layer.

14. A method as claimed in claim 13 in which said protective layer comprises a mixture of an ethoxylated bisphenol A diacrylate; an epoxy acrylate; and a photosensitive initiator.

15. An optical fiber produced by the method of claim 1.

16. An optical fiber produced by the method of claim 3.

17. An optical fiber produced by the method of claim 5.

18. An optical fiber produced by the method of claim 8.

19. An optical fiber produced by the method of claim 11.

20. An optical fiber produced by the method of claim 13.

21. An optical fiber produced by the method of claim 14.

* * * * *